United States Patent [19]

Davis

[11] Patent Number: 5,164,231

[45] Date of Patent: Nov. 17, 1992

[54] SOFT, ELASTOMERIC, POLYMER COATED CONTACT SURFACE AND METHOD OF PREPARING THE SAME

[76] Inventor: Elbert Davis, 30781 S. Coast Hury; Villa 91, Laguna Beach, Calif. 92651

[21] Appl. No.: 532,403

[22] Filed: Jun. 4, 1990

[51] Int. Cl.$^5$ ............................................. B05D 5/00
[52] U.S. Cl. .................................. 427/256; 427/288; 427/389; 427/389.9; 427/393.5; 428/195; 428/260; 428/263; 428/904; 2/161 A
[58] Field of Search ............... 524/505; 427/389, 256, 427/288, 389.9, 393.5; 428/195, 260, 263, 904; 2/161 A

[56] References Cited

U.S. PATENT DOCUMENTS 4,501,842 2/1985 Chmiel et al. .................. 524/505

*Primary Examiner*—James J. Bell
*Attorney, Agent, or Firm*—Robbins, Dalgarn, Berliner & Carson

[57] ABSTRACT

The gripping characteristics of the contact surface of a handle, grip or glove are improved by applying an extremely soft, elastomeric coating having a hardness of 20 to 40 Shore A, a tensile strength of 700 to 1700 psi, an elongation of 400 to 1400 percent and a tear resistance of 100 to 400 PLI, such as an oil-modified, styrene-/ethylene-butylene/styrene block copolymers. The oil-modified, styrene/ethylene-butylene/styrene block copolymer is dissolved by high temperature, high shear mixing in an aromatic hydrocarbon solvent, such as ethyl benzene, in the range of 10% to 45% solids. The coating solution can also contain a pigment. The thus formed coating solution is then applied to the contact surface and dried, so as to form the polymer coating.

13 Claims, No Drawings

SOFT, ELASTOMERIC, POLYMER COATED CONTACT SURFACE AND METHOD OF PREPARING THE SAME

BACKGROUND OF THE INVENTION

1. Field of the Invention

This invention relates to the chemical arts. In particular, it relates to polymeric coatings for contact surfaces and methods of coating such surfaces.

2. Description of the Prior Art

The handles of hand tools, such as hammers, screw drivers, and hatchets and of sports equipment, such as golf clubs, baseball bats and tennis rackets are generally made of hard materials. Typical of such hard materials are metal, wood and graphite composites.

It is often desirable to improve the grip that one can get on such handles. The better one's grip on a hand tool, the greater one's efficiency and safety and the less likely that one will strain his muscles upon prolonged or repeated use. The better one's grip on sports equipment, the gentler (less tight) one's grip and the less likely one is to tighten and strain his muscles.

It is known to improve one's grip by adding a relatively thick layer of a soft material to a hard handle, for example by wrapping the handle with fabric or leather or encasing the handle in a molded rubber or plastic grip. Among the plastics which can be injection molded to form a grip are styrene/ethylene-butylene/styrene block copolymer compositions sold by the Shell Chemical Company under the trademark Kraton. Alternatively, it is known to improve ones grip by wearing a glove made of relatively soft material, such as a glove made of fabric, leather, rubber or plastic.

Now, in accordance with the invention, it has been discovered that one's grip is further greatly improved when the contact surface of a handle, grip or a glove is coated with an extremely soft, elastomeric polymer.

SUMMARY OF THE INVENTION

The gripping characteristics of the contact surface of a handle, grip or glove are improved by applying an extremely soft, elastomeric coating having a hardness of 20 to 40 Shore A, a tensile strength of 700 to 1700 psi, an elongation of 400 to 1400 percent and a tear resistance of 100 to 400 PLI. In a preferred embodiment, the polymer used to form the coating is an oil-modified, styrene-/ethylene-butylene/styrene block copolymer composition sold by the Shell Chemical Company under the trademark Kraton G-2706.

In a preferred embodiment of the method of coating a contact surface, Kraton G-2706 is dissolved by high temperature, high shear mixing in ethyl benzene in the range of 10% to 45% solids, the thus formed coating solution is then applied to the contact surface and dried, so as to form the polymer coating. In some embodiments, the coating solution additionally contains a pigment.

DETAILED DESCRIPTION OF THE PREFERRED EMBODIMENTS

The soft, elastomeric polymer coating in accordance with the invention can be applied to any contact surface. Representative contact surfaces include handles for hand tools and sports equipment which are harder than the soft, elastomeric coating, such as handles made of metal, wood, fiberglass composites, graphite composites, ceramics, engineering plastics, and the like. Representative contact surfaces also include relatively soft contact surfaces, such as grips for hand tools and sports equipment made of leather, rubber, plastic, including Kraton G-2705, Kraton G-2706, Kraton G-7705, and the like; and gloves for work or sports made of leather, such as Cabretta sheep skin, goat skin, or suede, as well as gloves made of rubber, fabric and the like.

The polymers used to form the coating are soft, high tensile strength, high elongation, abrasion resistant polymers. Preferred polymers have a hardness of from about 20 to about 40 Shore A (as measured by ASTM D-2240), a tensile strength of about 700 to about 1700 psi (as measured by ASTM-D 412), an elongation of about 400 to about 1400% and a tear resistance of about 100 to about 400 pli (as measured by ASTM D-624). Polymers having a hardness at the lower end of the hardness range and an elongation at the upper-end of the elongation range are most preferred.

Representative polymers include natural or synthetic rubber elastomers, such as oil-modified styrene/ethylene-butadiene/styrene block copolymers, highly plasticized polyvinyl chloride elastomers, silicone rubbers and polyurethane elastomers. A preferred polymer is an oil-modified, styrene/ethylene-butylene/styrene block copolymer composition sold by the Shell Chemical Company under the trademark Kraton G-2706. Kraton G-2706 has a hardness of 28 Shore A, a tensile strength of 850, an elongation of 950%, and a tear resistance of 140 pli.

The contact surface is coated by applying the polymer in the form of a dispersion or solution. For example, natural or synthetic rubber dispersions or solutions are applied to the contact surface and then air-dried or heat-cured. Highly plasticized polyvinyl chlorides are applied in the form of a solution or of a plastisol dispersion and then air-dried or heat-fused. Liquid silicone rubbers are applied, at 100% solids, along with a vulcanizing catalyst, at room temperature. Polyurethane elastomers are applied from solution or a two component 100% solids reactive mixture can be applied using a machine having a suitable metering and mixing device.

In a preferred embodiment, Kraton G-2706 pellets are dissolved in an aromatic hydrocarbon solvent, such as ethyl benzene, in the range of 10% to 45% solids. The low solids mixtures are preferred when low viscosity dipping solutions are desired.

The Kraton G-2706 is dissolved by high temperature, high shear mixing, for example, by using an Arde-Barinco Homogenizer mixer which has sharp rotary blades which shear the solvent-softened polymer pellets against close-fitting stationary blades, thereby developing sufficient frictional heat (i.e. 150° F.) to completely dissolve the polymer. The thus formed coating solution is then applied to the contact area. The thus formed coating solution can be applied directly to molded Kraton grips, without the use of a primer. In other embodiments, where a grip or handle is made of materials such as wood, metal, or rubber, a separate coat of primer may be required to ensure adhesion of the polymer coating to the contact surface.

Kraton G-2706 containing coating solutions can be directly applied to porous leather or fabric with excellent adhesion. A separate coat of primer or other pretreatment may be required on other glove materials. The coating solution can be applied either before or after the material is fashioned into the glove. One skilled in the art will be able to determine the particular conditions required for a particular application without undue experimentation upon reading the specification.

In some embodiments, the solutions or dispersions contain additional ingredients, such as pigments. It is an unexpected advantage of the invention that when pigmented, Kraton G-2706-ethyl benzene coating solutions are applied to molded Kraton grip substrates, there is excellent adhesion of the pigmented coating.

In accordance with the method of this invention, it is now possible to form coated and decorated grips having both excellent adhesion and an attractive, decorative pattern using a Kraton grip which is injection molded with an indented pattern on its surface. A pigmented Kraton-ethyl benzene coating solution is first wiped into the indentations on the grip and the excess coating solution is then removed from the surface, e,g., by wiping-off with mineral spirits, to provide an adherent decorative pattern.

The coating solution can be applied to the contact surface in either a continuous or discontinuous pattern. In some embodiments, it is applied so that it evenly covers the entire contact surface. In other embodiments, it is applied so that raised shapes such as patches, dots, lines and the like are formed on the contact surface. In a preferred method for forming raised shapes from ethyl benzene coating solutions containing Kraton G-2706, first an even coating is applied from a low solids content solution and then dot shapes are applied from a high solids content solution.

The extremely soft, elastomeric coating increases the contact surface's coefficient of friction and reduces slipping. When both a handle or grip and a glove are coated in accordance with the invention, the high coefficient of friction provided by the contact of the two soft polymer surfaces provides for maximum control and minimum slipping with application of minimal gripping force (i.e. allows for a gentle touch in sports). Obviously, the contact between a coated glove and coated grip is nit permanent, but is readily releasable.

To increase the wear resistance of the adhesive coating and to provide additional roughness or texture to the contact surface, in some embodiments, the substrate surface is covered with a layer of woven fabric before the coating is applied. For example, a length of knitted or woven tubular gauze is slipped over a Kraton golf grip, which is then impregnated with a Kraton G-2706-ethyl benzene coating solution. If desired, a top-coating of a pigmented Kraton solution can then be applied.

The following examples are included to further illustrate the invention. They are not limitations thereon.

EXAMPLE I

A 19% polymer solids content coating solution was formed by mixing 150 grams Kraton G-2706, 600 grams ethyl benzene and 45 grams titanium dioxide pigment in an Arde-Barinco Homogenizer mixer until the temperature of the solution reached ca. 150° F. and the Kraton polymer completely dissolved. The coating solution was then applied to a black Kraton G-2706 golf grip, which had been injection molded with an indented pattern on its surface. The pigmented Kraton-ethyl benzene coating solution was wiped into the indentations on the grip using a doctor blade and excess coating solution was then removed from the surface, by wiping-off with mineral spirits. The thus coated grip was allowed to dry at room temperature. The resulting grip had a discontinuous white pigmented decorative pattern which possessed excellent adhesion to the surface of the Kraton grip.

EXAMPLE II

The method of Example I was repeated, except that a 20% polymer solids content coating solution was formed from 100 grams Kraton G-2706, 600 grams ethyl benzene and 45 grams titanium oxide pigment. The resulting grip had a discontinuous white pigmented decorative pattern which possessed excellent adhesion to the surface of the Kraton grip.

EXAMPLE III

A 25% polymer solids content coating solution was formed by mixing 200 grams Kraton G-2706 and 600 grams ethyl benzene in an Arde-Barinco Homogenizer mixer, until the temperature of the solution reached ca. 150° F. and the Kraton polymer completely dissolved. The coating solution was then applied to a suede Cabretta sheep skin glove. The Kraton-ethyl benzene coating solution was brushed onto the contact area of the glove and allowed to dry at room temperature to form a clear continuous coating. The contact surface of the resulting glove possessed a high coefficient of friction when compared to the coefficient of friction of an untreated glove.

EXAMPLE IV

A 41% polymer solids content coating solution was formed by mixing 300 grams Kraton G-2706, and 400 grams ethyl benzene and 30 grams titanium dioxide pigment in an Arde-Barinco Homogenizer mixer, until the temperature of the solution reached ca. 150° F. and the Kraton polymer completely dissolved. The coating solution was then applied to a suede Cabretta sheep skin glove. It was applied onto the contact area of the glove with a caulking gun in the form of white 1/16 inch beads. The thus coated glove was allowed to dry at room temperature. The contact surface of the resulting glove possessed a high coefficient of friction when compared to the coefficient of friction of an untreated glove.

EXAMPLE V

A 19% polymer solids content coating solution was formed by mixing 150 grams Kraton G-2706, 600 grams ethyl benzene and 40 grams #318 black iron oxide pigment in an Arde-Barinco Homogenizer mixer until the temperature of the solution reached 150° F. and the Kraton polymer completely dissolved.

The coating solution was then applied to a substrate comprised of a Kraton G-2706 golf grip, which had been covered with woven tubular gauze. The pigmented Kraton-ethyl benzene coating solution was then applied by brushing onto the substrate. The thus coated grip was allowed to dry at room temperature. The resulting grip had additional roughness or texture when compared to the molded grip alone and the continuous black coating exhibited excellent wear resistance when compared to grips which contained a coating, but no gauze.

EXAMPLE VI

The method of Example I was repeated, except that a coating solution was formed from 625 grams Kraton G-2706, 2500 grams ethyl benzene, 42 grams Ciba 4YLN pigment, 12 grams Ciba LGLD pigment and 104 grams titanium oxide pigment. The resulting grip had a discontinuous green pigmented decorative pattern which possessed excellent adhesion to the surface of the Kraton grip.

EXAMPLE VII

The method of Example I was repeated, except that a coating solution was formed from 625 grams Kraton G-2706, 2500 grams ethyl benzene, and 60 grams Ciba Irgalite #3RS pigment. The resulting grip had a discontinuous red pigmented decorative pattern which possessed excellent adhesion to the surface of the Kraton grip.

EXAMPLE VIII

The method of Example I was repeated, except that a coating solution was formed from 625 grams Kraton G-2706, 2500 grams ethyl benzene, 208 grams Harshaw cadmium selenide #1465 and 250 grams titanium oxide pigment. The resulting grip had a discontinuous yellow pigmented decorative pattern which possessed excellent adhesion to the surface of the Kraton grip.

What I claim and desire to protect by Letters Patent is:

1. A method for coating a contact surface comprising forming a coating solution by dissolving an oil-modified, styrene/ethylene-butylene/styrene block copolymer, having a hardness of 20 to 40 Shore A, a tensile strength of 700 to 1700 psi, an elongation of 400 to 1400 percent and a tear resistance of 100 to 400 pli, by high temperature, high shear mixing in a aromatic hydrocarbon solvent in the range of 10% to 45% solids, applying the thus formed coating solution to the contact area to form a polymeric coating thereon whereby to increase the coefficient of friction of said contact surface, and sufficiently drying the thus treated contact surface whereby to enable releasable contact with other surfaces.

2. A method in accordance with claim 1 wherein the contact surface is molded oil-modified, styrene/ethylene-butylene/styrene block copolymer.

3. A method in accordance with claim 2 wherein the molded copolymer contains an indented pattern on its surface.

4. A method in accordance with claim 1 wherein the aromatic hydrocarbon solvent is ethyl benzene.

5. A method in accordance with claim 1 wherein the coating solution contains a pigment.

6. A method in accordance with claim 3 wherein the coating solution contains a pigment.

7. A method in accordance with claim 4 wherein the coating contains a apigment.

8. A method in accordance with claim 1 wherein the contact surface is the surface of a glove.

9. A method in accordance with claim 6 wherein the contact surface is leather.

10. A coated contact surface in accordance with claim 1 wherein the contact surface is harder than the coating.

11. A coated contact surface in accordance with claim 1 wherein the contact surface is covered with a coating-impregnated woven fabric.

12. A method in accordance with claim 1 wherein the coating is continuous.

13. A method in accordance with claim 1 wherein the coating is discontinuous.

* * * * *